US009891517B2

United States Patent
Yamashita

(10) Patent No.: US 9,891,517 B2
(45) Date of Patent: Feb. 13, 2018

(54) TRANSLUCENT SCREEN AND IMAGE PROJECTION SYSTEM

(71) Applicant: Panasonic Intellectual Property Management Co., Ltd., Osaka (JP)

(72) Inventor: Takehiko Yamashita, Hyogo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/441,758

(22) Filed: Feb. 24, 2017

(65) Prior Publication Data

US 2017/0160621 A1 Jun. 8, 2017

Related U.S. Application Data

(63) Continuation of application No. PCT/JP2015/002005, filed on Apr. 9, 2015.

(30) Foreign Application Priority Data

Sep. 1, 2014 (JP) ................................. 2014-176835

(51) Int. Cl.
*G03B 21/62* (2014.01)
*G02F 1/31* (2006.01)
(Continued)

(52) U.S. Cl.
CPC ........... *G03B 21/62* (2013.01); *G02F 1/1333* (2013.01); *G02F 1/167* (2013.01); *G02F 1/31* (2013.01);
(Continued)

(58) Field of Classification Search
CPC ........ G03B 21/62; G02F 1/31; H04N 9/3141; H04N 5/58
(Continued)

(56) References Cited

U.S. PATENT DOCUMENTS 5,075,789 A 12/1991 Jones et al.
5,175,637 A 12/1992 Jones et al.
(Continued)

FOREIGN PATENT DOCUMENTS

JP 2006-064832 A 3/2006
JP 2012-220540 A 11/2012
(Continued)

OTHER PUBLICATIONS

International Search Report issued in Application No. PCT/JP2015/002005 dated Jun. 30, 2015, with English translation.

*Primary Examiner* — Christopher Mahoney
(74) *Attorney, Agent, or Firm* — McDermott Will & Emery LLP

(57) ABSTRACT

An image projection system includes a translucent screen, a projector that projects image light to the translucent screen, and a controller that controls the projector and the translucent screen. The translucent screen includes a first light control film configured to be switchable between a transmissive state for transmitting incident light therethrough and a diffusion state for diffusing incident light, and a second light control film configured such that the transmittance thereof with respect to incident light can be changed. The controller has: a first mode in which, in the state where the projector does not project image light, the first light control film is in the transmissive state and the second light control film is in the state of having transmittance for transmitting incident light therethrough; and a second mode in which, in the state where the projector projects image light, the first light control film is in the diffusion state and the second light control film is in the state of having transmittance lower than the transmittance in the first mode. The controller is settable to the first mode or the second mode.

11 Claims, 11 Drawing Sheets

(51) Int. Cl.
  *H04N 9/31*    (2006.01)
  *G02F 1/1333*  (2006.01)
  *G02F 1/167*   (2006.01)
  *H04N 5/58*    (2006.01)
  *G02B 1/11*    (2015.01)

(52) U.S. Cl.
  CPC ............ *H04N 5/58* (2013.01); *H04N 9/3141* (2013.01); *G02B 1/11* (2013.01); *G02F 2001/1678* (2013.01); *G02F 2201/44* (2013.01)

(58) Field of Classification Search
  USPC ................................ 359/443, 449, 459, 460
  See application file for complete search history.

(56) References Cited

U.S. PATENT DOCUMENTS

| | | | | |
|---|---|---|---|---|
| 5,193,015 | A * | 3/1993 | Shanks | G02B 5/3016 |
| | | | | 348/E9.025 |
| 5,416,617 | A * | 5/1995 | Loiseaux | E06B 9/24 |
| | | | | 349/1 |
| 7,614,750 | B2 * | 11/2009 | May | G03B 21/56 |
| | | | | 353/29 |
| 7,724,431 | B2 * | 5/2010 | Field | G03B 21/56 |
| | | | | 359/443 |
| 2015/0362728 | A1 | 12/2015 | Tei | |

FOREIGN PATENT DOCUMENTS

| | | |
|---|---|---|
| JP | 2014-081580 A | 5/2014 |
| WO | 2014/024298 A1 | 2/2014 |
| WO | 2014/112412 A1 | 7/2014 |

\* cited by examiner

FIG. 7

| Operating state<br>Block | Transparent | Image projection | Light blocking |
|---|---|---|---|
| Diffusible light control film | Transmissive state | Diffusion state | Diffusion state |
| Transmittance-changeable light control film | Transmissive state | Semi-transmissive state | Light blocking state |
| Projector | OFF | Image projection | OFF |

FIG. 8

| State of transmittance-changeable light control film / Transmittance | Transmittance of diffusible light control film | Transmittance of transmittance-changeable light control film | Total transmittance of light control film | Transmittance of translucent screen | Contrast ratio (white:black) |
|---|---|---|---|---|---|
| Transmissive state | 81% | 64% | 52% | 56% | 92:1 |
| Semi-transmissive state | 81% | 32% | 26% | 30% | 150:1 |
| Light blocking state | 81% | 4% | 3% | 6% | 45:1 |
| Translucent screen: transparent mode | 81% | 64% | 52% | 56% | — |

- Diffusible light control film: diffusion state
- Illuminance on screen: 165 (lx)
- Light quantity of projector: 6500 (lm)

FIG. 10

| State of transmittance-changeable light control film / Transmittance | Transmittance of diffusible light control film | Transmittance of transmittance-changeable light control film | Total transmittance of light control film | Transmittance of translucent screen | Contrast ratio (white:black) |
|---|---|---|---|---|---|
| Transmissive state | 81% | 64% | 52% | 57% | 93:1 |
| Semi-transmissive state | 81% | 33% | 27% | 32% | 152:1 |
| Light blocking state | 81% | 4% | 3% | 8% | 46:1 |
| Translucent screen: transparent mode | 81% | 64% | 52% | 56% | — |

- Diffusible light control film: diffusion state
- Illuminance on screen: 165 (lx)
- Light quantity of projector: 6500 (lm)

FIG. 11

| Operating state\Block | Transparent | Image projection and light blocking |
|---|---|---|
| Diffusible light control film | Transmissive state | Diffusion state |
| Transmittance-changeable light control film | Transmissive state | Light blocking state |
| Projector | OFF | Image projection or OFF |

TRANSLUCENT SCREEN AND IMAGE PROJECTION SYSTEM

RELATED APPLICATIONS

This application is a continuation of International Application No. PCT/JP2015/002005, filed on Apr. 9, 2015, which in turn claims the benefit of Japanese Application No. 2014-176835, filed on Sep. 1, 2014, the disclosures of which Applications are incorporated by reference herein.

BACKGROUND

1. Technical Field

The present disclosure relates to a translucent screen that displays an image based on image light projected from a projector, and an image projection system provided with the translucent screen.

2. Description of the Related Art

Unexamined Japanese Patent Publication. No. 2012-220540 (Patent Literature 1) discloses an apparatus that projects image light from a projector in the state intermediate between a light transmissive state and a light diffusion state to display an image on a surface opposite to the surface irradiated with the image light.

SUMMARY

The translucent screen according to the present disclosure includes a first light control film and a second light control film. The first light control film is configured to be switchable between a transmissive state for transmitting incident light therethrough and a diffusion state for diffusing incident light. The second light control film is configured such that the transmittance thereof with respect to incident light is changed.

The image projection system according to the present disclosure includes a projector and a translucent screen. The translucent screen includes a first light control film and a second light control film. The first light control film is configured to be switchable between a transmissive state for transmitting incident light therethrough and a diffusion state for diffusing incident light. The second light control film is configured such that the transmittance thereof with respect to incident light is changed.

The image projection system according to the present disclosure includes a translucent screen, a projector that projects image light to the translucent screen, and a controller that controls the projector and the translucent screen. The translucent screen includes a first light, control film configured to be switchable between a transmissive state for transmitting incident light therethrough and a diffusion state for diffusing incident light, and a second light control film configured such that the transmittance thereof with respect to incident light is changed. The controller has: a first mode in which, in the state where the projector does not project image light, the first light control film is in the transmissive state and the second light control film is in the state of having transmittance for transmitting incident light therethrough; and a second mode in which, in the state where the projector projects image light, the first light control film is in the diffusion state and the second light control film is in the state of having transmittance lower than the transmittance in the first mode, the controller being settable to the first mode and the second mode.

The translucent screen according to the present disclosure includes a first light control film configured to be switchable between a transmissive state for transmitting incident light therethrough and a diffusion state for diffusing incident light, a second light control film configured such that the transmittance thereof with respect to incident light is changed, and a controller configured to control the first light control film and the second light control film. The controller controls such that, when a projector, which is located closer to the first light control film than to the second light control film and projects image light to the first light control film, does not project the image light, the first light control film is set to the transmissive state and the second light control film is set to have transmittance for transmitting the incident light therethrough, and when the projector projects the image light, the first light control film is set to the diffusion state and the second light control film is set to have transmittance lower than the transmittance in the first mode.

BRIEF DESCRIPTION OF THE DRAWINGS

FIG. 7 is a diagram illustrating an operating state of the image projection system according to the first exemplary embodiment;

FIG. 8 is a diagram illustrating the result of an experiment conducted to the translucent screen in each operating mode in the first exemplary embodiment;

FIG. 10 is a diagram illustrating the result of an experiment conducted to the translucent screen in each operating mode in the second exemplary embodiment; and FIG. 11 is a diagram illustrating an operating state of an image projection system according to a third exemplary embodiment.

DETAILED DESCRIPTION

Exemplary embodiments will be described below in detail with reference to the drawings as necessary. However, more than necessary detailed descriptions may be omitted. For example, detailed descriptions for matters which have already been well known in the art and redundant descriptions for substantially the same configurations may be omitted. This is to prevent the description below from becoming unnecessarily redundant to facilitate understanding of a person skilled in the art.

Note that the accompanying drawings and the following description are provided in order for a person of ordinary skill in the art to sufficiently understand the present disclosure, and they are not intended to limit the subject matter set forth in the claims.

The same reference marks, signs, and numerals in the description indicate the same components, unless otherwise stated. In addition, components which are inessential to the present disclosure are not illustrated, unless otherwise stated.

First Exemplary Embodiment

The first exemplary embodiment will be described with reference to FIGS. 1 to 8.
[1-1. Configuration]
FIG. 1 is a view schematically illustrating one example of a configuration of image projection system 100 according to the first exemplary embodiment.

Figure 1:
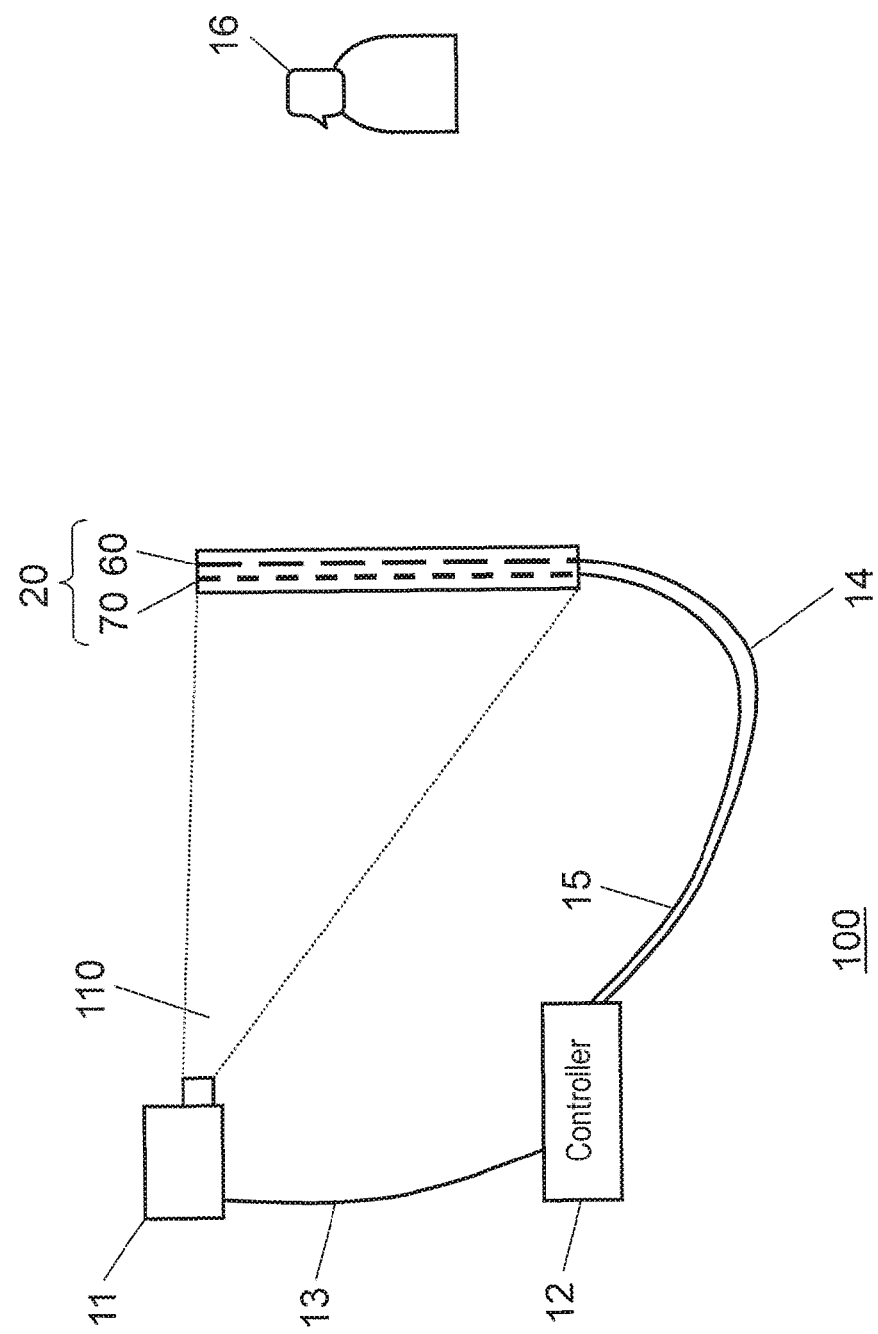
FIG. 1 is a view schematically illustrating one example of a configuration of an image projection system according to a first exemplary embodiment.

As illustrated in FIG. 1, image projection system 100 according to the present exemplary embodiment includes projector 11, translucent screen 20, and controller 12.

Projector 11 is configured to project image light 110 based on an image signal to translucent screen 20 and display an image based on image light 110 onto translucent screen 20. Projector 11 has substantially the same configuration as a generally used projector and operates similarly thereto, and therefore, the detailed description thereof will be omitted.

Note that projector 11 may include an image reproducing device (not illustrated) that reproduces a display image based on an image signal, or projector 11 and the image reproducing device may be separately provided.

Notably, it is supposed that projector 11 generates image light 110 in such a manner that an image is displayed in the correct orientation with respect to user 16 facing projector 11 across translucent screen 20. However, the exemplary embodiment is not limited to the configuration described above. Projector 11 may generate image light 110 in such a manner that an image is displayed in the correct orientation with respect to user 16 (not illustrated) who views translucent screen 20 from the same direction as projector 11.

Translucent screen 20 includes diffusible light control film 70 and transmittance-changeable light control film 60. Diffusible light control film 70 is one example of a first light control film, and transmittance-changeable light control film 60 is one example of a second light control film. Diffusible light control film 70 and transmittance-changeable light control film 60 are bonded to each other by a transparent adhesive layer to be integrated. The detail of translucent screen 20 will be described later.

Controller 12 performs the control of projector 11 and the control of diffusible light control film 70 and transmittance-changeable light control film 60. Controller 12 and projector 11 are electrically connected to each other through control line 13. Controller 12 and transmittance-changeable light control film 60 are electrically connected to each other through control line 14. In addition, controller 12 and diffusible light control film 70 are electrically connected to each other through control line 15.

Controller 12 transmits a control signal to projector 11 through control line 13, thereby being capable of controlling the start/stop of the projection of image light 110 from projector 11.

In addition, controller 12 controls a voltage to be applied to transmittance-changeable light control film 60 through control line 14, thereby being capable of controlling the transmittance of transmittance-changeable light control film 60. Note that, in the present exemplary embodiment, the proportion of transmitted light to incident light is defined as transmittance. For example, if light (transmitted light) transmitting through transmittance-changeable light control film 60 becomes a half of the incident light, the transmittance is 50%.

In addition, controller 12 can set diffusible light control film 70 to be in a transmissive state or a diffusion state by controlling a voltage to be applied to diffusible light control film 70 through control line 15.

It is to be noted that controller 12 may independently be provided as illustrated, in FIG. 1, or may be built in projector 11 or translucent screen 20.

The control to start/stop the projection of image light 110 from projector 11 may be performed based on whether or not whole area of the display image is made black, or may be performed by switching on/off of a light source (not illustrated) of the image light.

Next, the specific installation example of image projection system 100 will be described.

Figure 2:
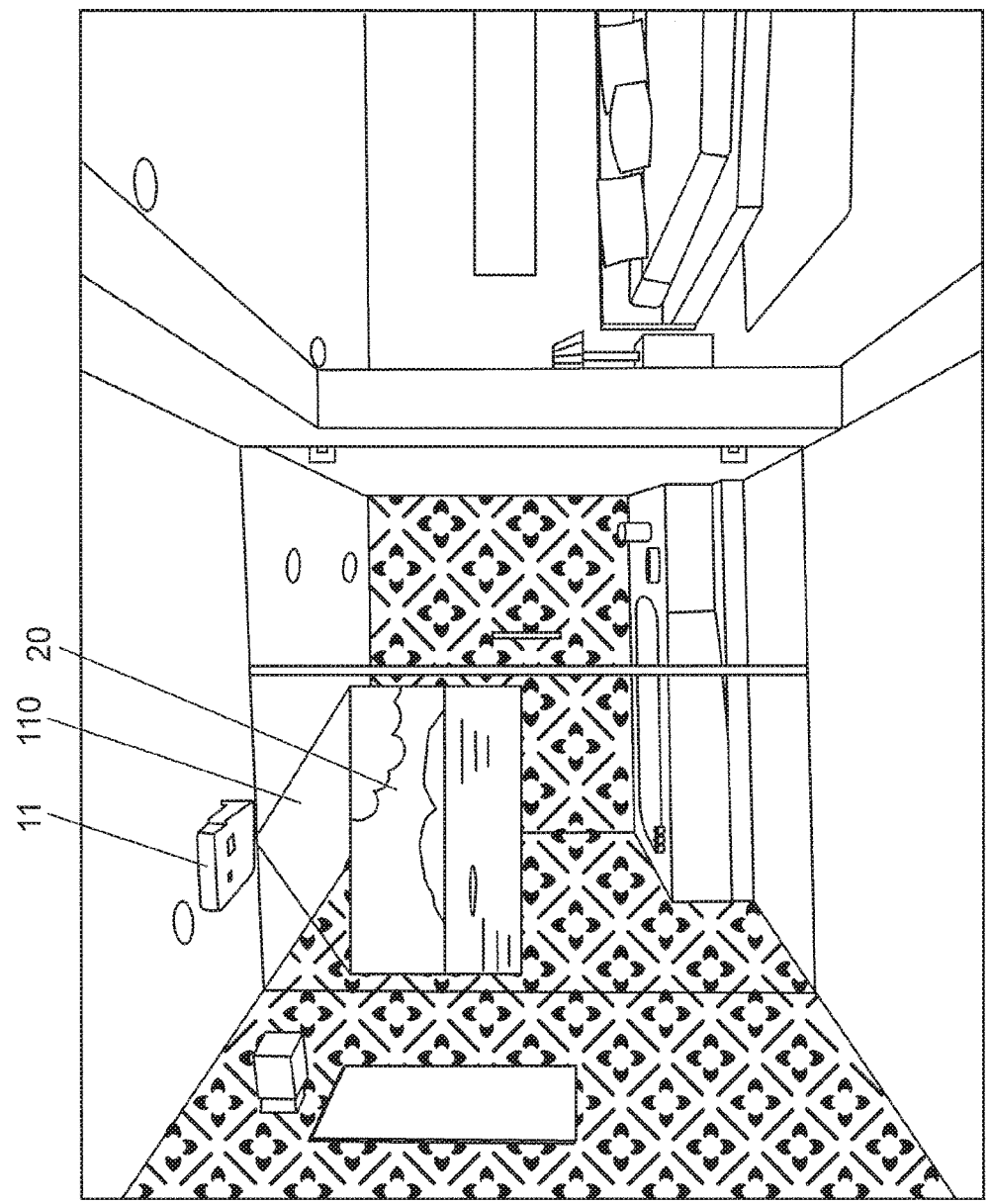
FIG. 2 is a view schematically illustrating one installation example of the image projection system according to the first exemplary embodiment.

FIG. 2 is a view schematically illustrating one installation example of image projection system 100 according to the first exemplary embodiment.

FIG. 2 illustrates an example in which image projection system 100 is installed in a room in a hotel. In the example in FIG. 2, translucent screen 20 is embedded into a glass placed as a partition for a bathroom. User 16 (not illustrated) using the bathroom can enjoy the image based on image light 110 projected onto translucent screen 20 from projector 11 from the bathroom.

In image projection system 100, translucent screen 20 is configured as described later, whereby a high-contrast image can be displayed on translucent screen 20 under a bright environment. Therefore, in the example in FIG. 2, even if a light in the bathroom is turned on, user 16 can enjoy the image displayed on translucent screen 20 at high contrast.

In addition, image projection system 100 enables translucent screen 20 to be in a transparent state or a state of blocking light, when projector 11 does not project image light 110. This configuration will be described later in detail.

Next, translucent screen 20 will be described.

Figure 3:
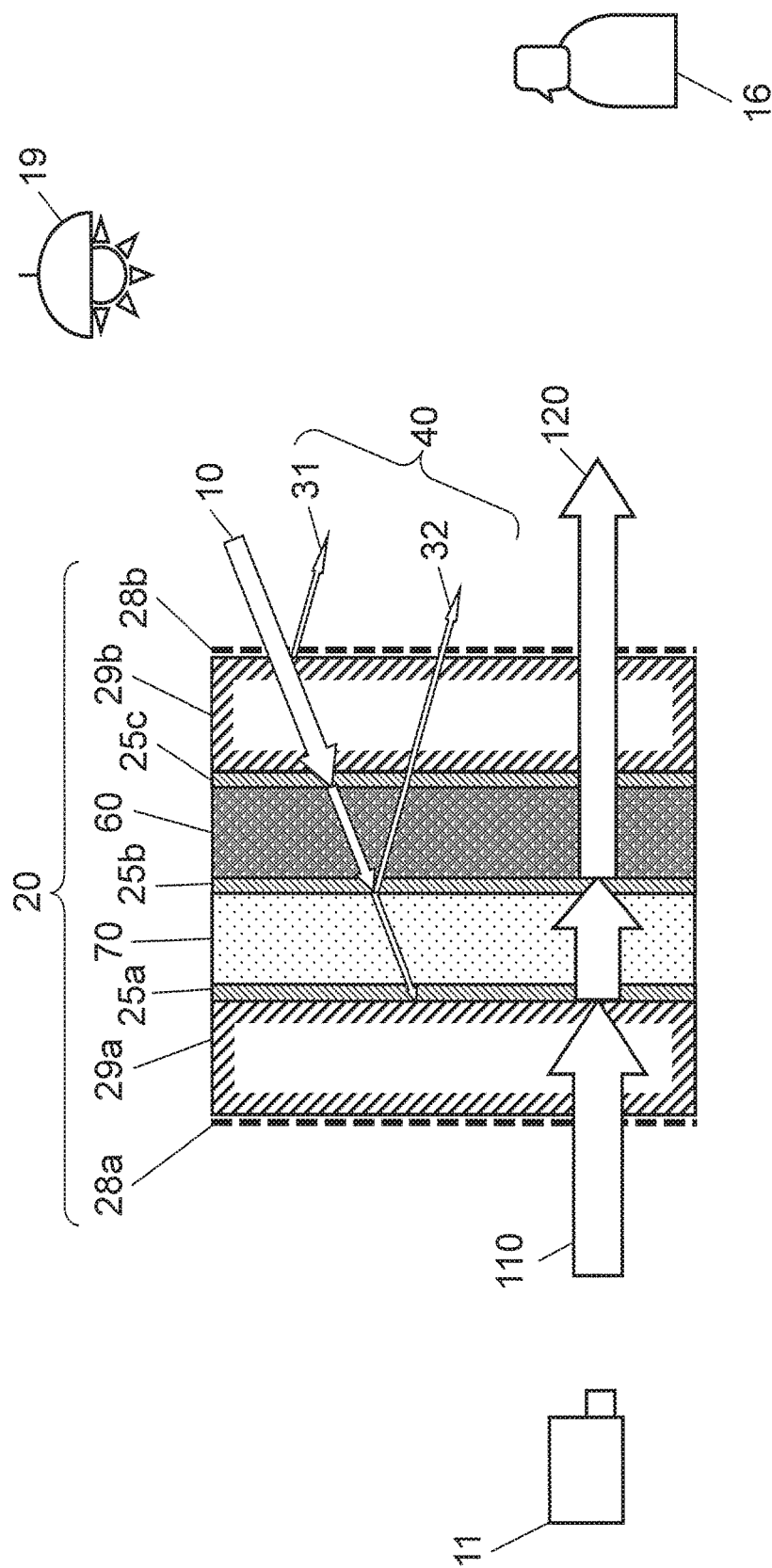
FIG. 3 is a sectional view illustrating a part of a translucent screen according to the first exemplary embodiment in an enlarged manner.

FIG. 3 is a sectional view illustrating a part of translucent screen 20 according to the first exemplary embodiment in an enlarged manner.

As illustrated in FIG. 3, translucent screen 20 has transparent plates 29a and 29b, antireflection films 28a and 28b, diffusible light control film 70, and transmittance-changeable light control film 60.

Transparent plates 29a and 29b are formed from a transparent glass, for example. However, they may be formed from other materials such as a transparent resin.

Translucent screen 20 has the structure described below. Antireflection film 28a is attached on one surface of transparent plate 29a, and one surface of diffusible light control film 70 is attached on the other surface through intermediate film 25a serving as a transparent adhesive layer. One surface of transmittance-changeable light control film 60 is attached on the other surface of diffusible light control film 70 through intermediate film 25b serving as a transparent adhesive layer. One surface of transparent plate 29b is attached on the other surface of transmittance-changeable light control film 60 through intermediate film 25c serving as a transparent adhesive layer. Antireflection film 28b is attached on the other surface of transparent plate 29b.

Note that an AR film (Antireflection film) generally used and having an antireflection layer formed on a surface thereof can be used for antireflection films 28a and 28b. The thickness of each of antireflection films 28a and 28b is about 100 μm, for example. However, the thickness is not limited thereto in the present exemplary embodiment. Further, a transparent resin or the like generally used as an adhesive can be used for intermediate films 25a, 25b, and 25c.

Diffusible light control film 70 is configured so as to be able to be switched between two states described below.
1) "Transmissive state" for transmitting incident light therethrough
2) "Diffusion state" for diffusing incident light in various directions The example in which the switching between these states is performed based on a voltage will be described below. However, the present exemplary embodiment does not particularly limit the method for performing the switching described above. For example, this switching may be performed based on ultraviolet irradiation. The detail of diffusible light control film 70 will be described later.

Transmittance-changeable light control film 60 is configured so as to vary the transmittance thereof with respect to incident light. The present exemplary embodiment describes the example in which transmittance-changeable light control film 60 is configured so as to be able to be switched among three states described below.
1) "Transmissive state" in which the transmittance is set so as to allow incident light to transmit
2) "Light blocking state" in which the transmittance is set to be lower than the transmittance in the transmissive state in order to block incident light
3) "Semi-transmissive state" in which the transmittance is set between the transmittance in the transmissive state and the transmittance in the light blocking state The example in which the switching among these states is performed based on a voltage will be described below. However, the present exemplary embodiment does not particularly limit the method for performing the switching described above. For example, this switching may be performed based on ultraviolet irradiation. The detail of transmittance-changeable light control film 60 will be described later.

Note that FIG. 3 also illustrates light source 19. Light source 19 is a light source of external light 10 which is the main cause to lower the contrast of the image to be displayed on translucent screen 20. External, light 10 emitted from light source 19 is reflected on translucent screen 20 to become reflection lights 31 and 32, and is observed by user 16 together with transmitted light 120 of image light 110. When the amount of the reflection light is large, the contrast of the image displayed on translucent screen 20 is lowered. However, translucent screen 20 according to the present exemplary embodiment reduces reflection light of external light 10 to be able to increase the contrast of the image displayed on translucent screen 20. This configuration will be described later in detail.

Note that external light 10 may be illumination light or natural light such as sunlight. In the present exemplary embodiment, light which is other than image light 110 and which causes the reduction in the contrast of the image displayed on translucent screen 20 is defined as external light 10.

While the reflection light from external light 10 is generated on each border of the layers in translucent screen 20, FIG. 3 illustrates only reflection lights 31 and 32 as representative reflection lights, and does not illustrate other reflection lights. FIG. 3 does not indicate that reflection light other than reflection lights 31 and 32 is not generated.

Next, diffusible light control film 70 will be described.

Figure 4A:
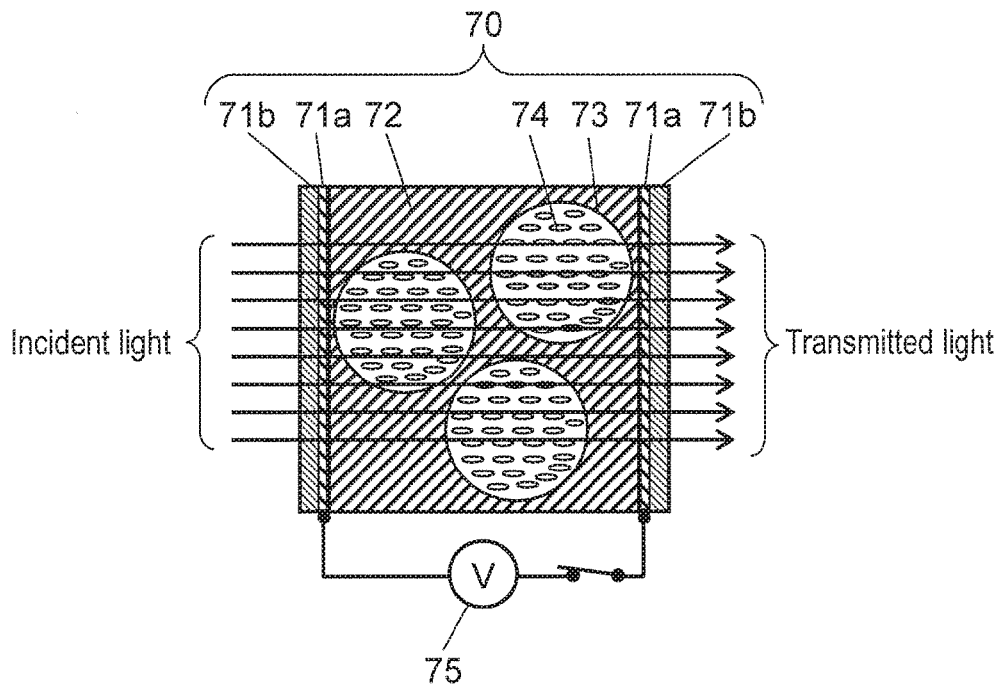
FIG. 4A is a sectional view in which a diffusible light control film in a transmissive state in the first exemplary embodiment is partially enlarged.
Figure 4B:
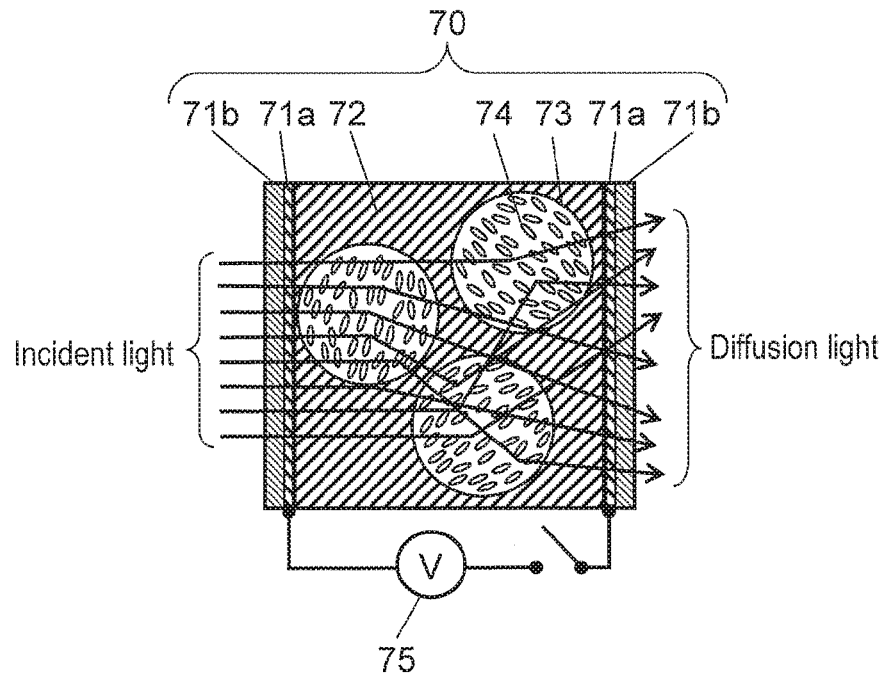
FIG. 4B is a sectional view in which the diffusible light control film in a diffusion state in the first exemplary embodiment is partially enlarged.

FIG. 4A is a sectional view in which diffusible light control film 70 in the transmissive state in the first exemplary embodiment is partially enlarged. FIG. 4B is a sectional view in which diffusible light control film 70 in the diffusion state in the first exemplary embodiment is partially enlarged.

As illustrated in FIGS. 4A and 4B, diffusible light control film 70 includes polymer 72 and a plurality of liquid crystal capsules 73 enclosed in polymer 72 between a pair of transparent electrodes 71a. Each of transparent electrodes 71a is formed on the surface of transparent film 71b that is transparent and has high insulating property. A plurality of liquid crystal molecules 74 having light diffusing properties is confined in each of liquid crystal capsules 73. Liquid crystal molecules 74 are displaced when voltage 75 is applied thereto.

When voltage 75 is applied between transparent electrodes 71a, liquid crystal molecules 74 in liquid crystal capsule 73 are aligned as illustrated in FIG. 4A. Then, diffusible light control film 70 is brought into the "transmissive state" for transmitting incident light therethrough.

On the other hand, when voltage 75 is not applied between transparent electrodes 71a, each liquid crystal molecules 74 in liquid crystal capsule 73 is irregularly aligned as illustrated in FIG. 4B. Then, diffusible light control film 70 is brought into the "diffusion state" for diffusing incident light.

Notably, in image projection system 100, when image light 110 is projected to translucent screen 20 from projector 11, diffusible light control film 70 is set to be in the diffusion state illustrated in FIG. 4B. This is to increase a viewing angle of the displayed image by diffusing image light 110 incident on diffusible light, control film 70. Thus, user 16 can view the image displayed on translucent screen 20 from various angles.

Next, transmittance-changeable light control film 60 will be described.

Figure 5A:
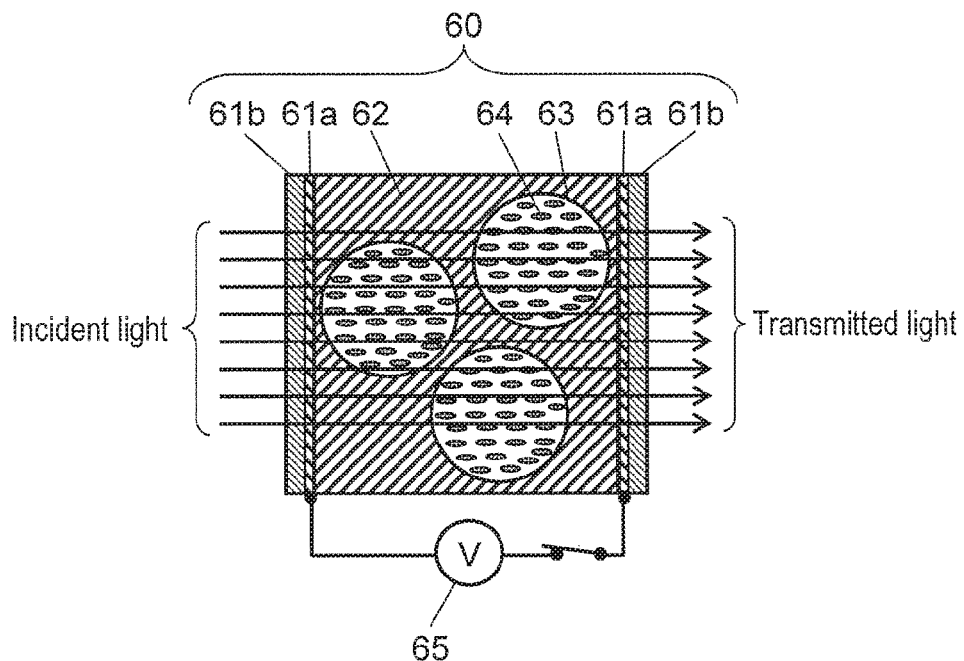
FIG. 5A is a sectional view in which a transmittance-changeable light control film in a transmissive state in the first exemplary embodiment is partially enlarged.
Figure 5B:
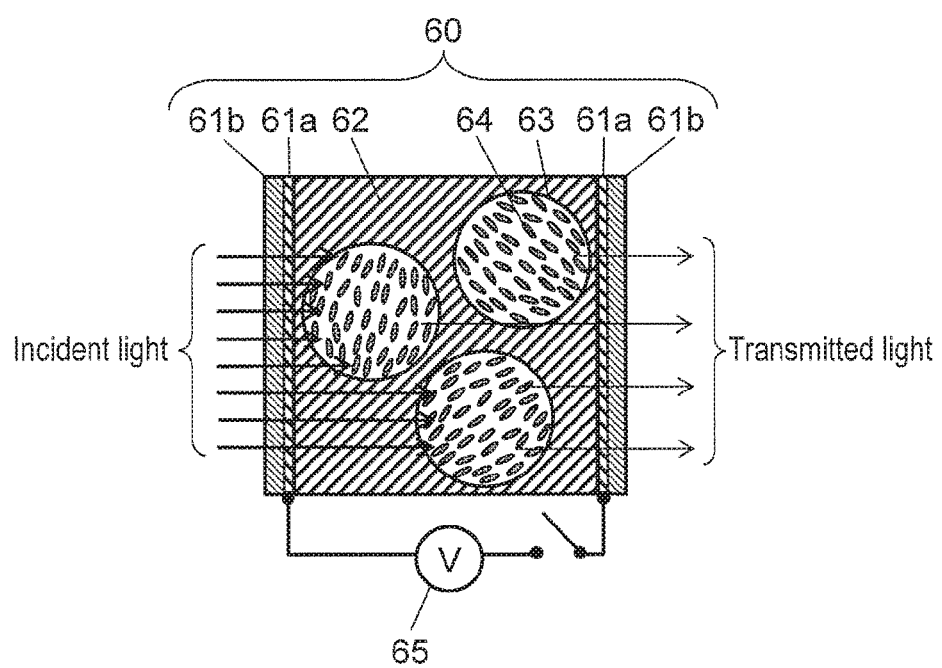
FIG. 5B is a sectional view in which the transmittance-changeable light control film in a light blocking state in the first exemplary embodiment is partially enlarged.
Figure 6:
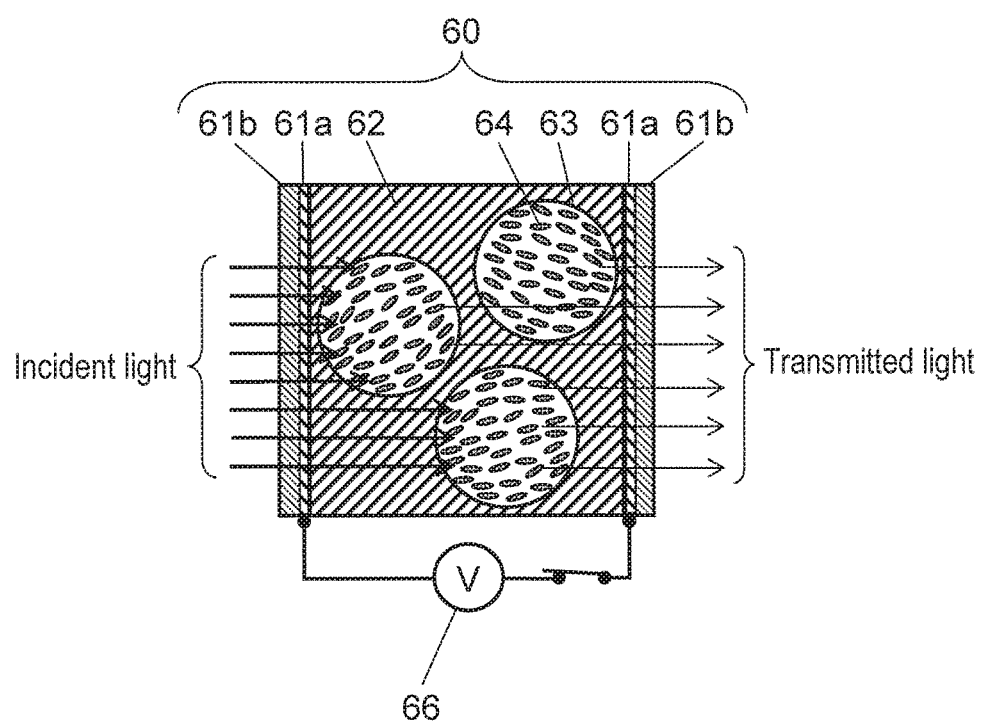
FIG. 6 is a sectional view in which the transmittance-changeable light control film in a semi-transmissive state in the first exemplary embodiment is partially enlarged.

FIG. 5A is a sectional view in which transmittance-changeable light control film 60 in the transmissive state in the first exemplary embodiment is partially enlarged. FIG. 5B is a sectional view in which transmittance-changeable light control film 60 in the light blocking state in the first exemplary embodiment is partially enlarged. FIG. 6 is a sectional view in which the transmittance-changeable light control film in the semi-transmissive state in the first exemplary embodiment is partially enlarged.

As illustrated in FIGS. 5A and 5B, transmittance-changeable light control film 60 includes polymer 62 and a plurality of colored capsules 63 enclosed in polymer 62 between a pair of transparent electrodes 61a. Each of transparent electrodes 61a is formed on the surface of transparent film 61b that is transparent and has high insulating property. A plurality of colored particles 64 which is colored and has less property to diffuse light is confined in each of colored capsules 63. Colored particles 64 are displaced when a voltage is applied thereto. Note that particles which can be colored and are displaced with an application of a voltage may be used for colored particles 64. Colored particles 64 may be liquid crystal molecules.

When voltage 65 is applied between transparent electrodes 61a, colored particles 64 in colored capsule 63 are aligned as illustrated in FIG. 5A. Then, transmittance-changeable light control film 60 is brought into the "transmissive state" for transmitting incident light therethrough.

On the other hand, when voltage 65 is not applied between transparent electrodes 61a, colored particles 64 in colored capsule 63 are irregularly aligned as illustrated in FIG. 5B. Then, transmittance-changeable light control film 60 is brought into the "light blocking state" in which the amount of transmitted light extremely lower than the amount of incident light. In the light blocking state, transmittance-changeable light control film 60 looks as if it is colored by the color of colored particles 64.

The amount of displacement of colored particles 64 varies according to the magnitude of the voltage to be applied between transparent electrodes 61a. The lower the voltage is, the more irregularly colored particles 64 are aligned. Therefore, the lower the voltage to be applied between transparent electrodes 61a is, the darker the color of the appearance of transmittance-changeable light control film 60 becomes. When voltage 65 is not applied between transparent electrodes 61a, the color of the appearance of transmittance-changeable light control film 60 becomes the darkest (light blocking state illustrated in FIG. 5B). On the other hand, when voltage 65 having an upper-limit value of the voltage which can be applied between transparent electrodes 61a is applied between transparent electrodes 61a, the color of the appearance of transmittance-changeable light control film 60 becomes the lightest state (transmissive state illustrated in FIG. 5A).

When voltage 66 lower than the voltage for the transmissive state is applied between transparent electrodes 61a, the color of the appearance of transmittance-changeable light control film 60 becomes the state between the transmissive state illustrated in FIG. 5A and the light blocking state illustrated in FIG. 5B, and the amount of transmitted light transmitting through transmittance-changeable light control film 60 becomes the value of light between the amount in the transmissive state and the amount in the light blocking state, as illustrated in FIG. 6. This state is referred to as the "semi-transmissive state" in the present exemplary embodiment. In image projection system 100, when image light 110 is projected to translucent screen 20 from projector 11, transmittance-changeable light control film 60 is set to be the semi-transmissive state.

Note that the voltage value of voltage 65 is not limited to the upper-limit value of the voltage that can be applied between transparent electrodes 61a. Voltage 65 may be set a voltage value by which transmittance-changeable light control film 60 is in substantially the transmissive state. In addition, it is desirable that the voltage value of voltage 66 is appropriately set on the basis of an experiment in which an image displayed on translucent screen 20 is viewed or on the basis of the specification of image projection system 100, or the like.

Note that the color used to color colored particles 64 is dark blue, for example. However, the present exemplary embodiment does not particularly limit the color of colored particles 64 to dark blue, and any other colors may be used. It should be noted, however, that according to the experiment in which the displayed image is viewed, the experiment in which the contrast of the displayed image is measured, and the like, colored particles 64 are desirably colored with dark color such as dark blue, and dark gray is more desirable.

Transparent electrodes 61a and 71a can be formed by using ITO (indium tin oxide), for example. However, the present exemplary embodiment does not particularly limit the material of transparent electrodes 61a and 71a to ITO. Transparent electrodes 61a and 71a may be formed from other materials. In addition, while transparent films 61b and 71b can be formed by using PET (polyethylene terephthalate), for example, but the present exemplary embodiment does not particularly limit the material of transparent films 61b and 71b to PET. Transparent films 61b and 71b may be formed from other materials.

[1-2. Operation]

The operation of image projection system 100 thus configured will be described below.

FIG. 7 is a diagram illustrating an operating state of image projection system 100 according to the first exemplary embodiment.

In image projection system 100 according to the present exemplary embodiment, translucent screen 20 is used while being set to any one of three states illustrated in FIG.
1) "Transparent mode" in which diffusible light control film 70 and transmittance-changeable light control film 60 are both set to the transmissive state to make translucent screen 20 transparent state
2) "Image projection mode" in which diffusible light control film 70 is set to the diffusion state and transmittance-changeable light control film 60 is set to the semi-transmissive state to allow image light 110 to be projected onto translucent screen 20 from projector 11
3) "Light blocking mode" in which diffusible light control film 70 is set to the diffusion state and transmittance-changeable light control film 60 is set to the light blocking state to make translucent screen 20 non-transparent state It is supposed that, in image projection system 100, controller 12 controls each component in image projection system 100 in such a manner that the start/stop of the projection of image light 110 from projector 11 and the switching of modes of translucent screen 20 are in conjunction with each other.

To set translucent screen 20 to the "transparent mode", controller 12 applies voltage 75 to diffusible light control film 70 through control line 15 to bring diffusible light control film 70 into the transmissive state. In addition, controller 12 applies voltage 65 to transmittance-changeable light control film 60 through control line 14 to also bring transmittance-changeable light control film 60 into the transmissive state. Thus, the transmittance of translucent screen 20 becomes substantially the maximum, and therefore, translucent screen 20 becomes substantially transparent. At that time, controller 12 controls projector 11 through control line 13 to stop the projection of image light 110 from projector 11.

To set translucent screen 20 to the "image projection mode", controller 12 turns off voltage 75 to be applied to diffusible light control film 70 through control line 15 to bring diffusible light control film 70 into the diffusion state. In addition, controller 12 applies voltage 66, which is lower than voltage 65, to transmittance-changeable light control film 60 through control line 14 to bring transmittance-changeable light control film 60 into the semi-transmissive state. Thus, translucent screen 20 is brought into the state suitable for displaying an image based on image light 110 projected from projector 11. At that time, controller 12 controls projector 11 through control line 13 to start the projection of image light 110 from projector 11. Thus, image light 110 is projected onto translucent screen 20 from projector 11, whereby an image based on image light 110 is displayed on translucent screen 20 at high contrast. The reason why a high-contrast image can be provided will be described later. Notably, in the present exemplary embodiment, the value of voltage 66 is supposed to be set such that the transmittance of transmittance-changeable light control film 60 is about 32%. However, the transmittance of transmittance-changeable light control film 60 in the semi-transmissive state is not particularly limited to this value, and it may assume any other values.

To set translucent screen 20 to the "light blocking mode", controller 12 turns off voltage 75 to be applied to diffusible light control film 70 through control line 15 to bring diffusible light control film 70 into the diffusion state. In addition, controller 12 turns off voltages 65 and 66 to be applied to transmittance-changeable light control film 60 through control line 14 to bring transmittance-changeable light control film 60 into the light blocking state. Thus, the transmittance of translucent screen 20 becomes substantially the minimum, and therefore, translucent screen 20 becomes substantially non-transparent. At that time, controller 12 controls projector 11 through control line 13 to stop the projection of image light 110 from projector 11.

It is to be noted that image projection system 100 is desirably configured such that user 16 can arbitrarily issue an instruction to start/stop the projection of image light 110 to projector 11. Image projection system 100 is also desirably configured such that, when the projection of image light 110 from projector 11 is started, translucent screen 20 is automatically switched to the "image projection mode". Image projection system 100 is also desirably configured such that, when the projection of image light 110 from projector 11 is stopped, user 16 can arbitrarily choose whether to set translucent screen 20 to the "transparent mode" or to the "light blocking mode" according to the usage condition of translucent screen 20. According to this configuration, the usability of user 16 using image projection system 100 can be enhanced.

Note that "OFF" in FIG. 7 merely indicates that the projection of image light 110 from projector 11 is stopped, and does not mean that the power source of projector 11 is turned off. Controller 12 may stop the projection of image light 110 by turning off the power source of projector 11, or may control projector 11 such that only the projection of image light 110 is stopped while the power source of projector 11 is turned on.

Next, the transmittance of translucent screen 20 in each mode and the contrast of an image to be displayed on translucent screen 20 will be described with reference to FIG. 8. Note that the transmittance is a proportion of transmitted light to incident light as described above.

FIG. 8 is a diagram illustrating the result of an experiment conducted to translucent screen 20 in each operating mode in the first exemplary embodiment.

The experiment was conducted under the condition in which translucent screen 20 and projector 11 were installed in a closed room, only a light (fluorescent light) provided on the ceiling of this room was turned on, and the entry of light other than the illumination light into this room was set to be blocked. In this case, the illuminance on translucent screen 20 in the horizontal direction was 165 lx (lux). In addition, the amount of light projected to translucent screen 20 from projector 11 was about 6500 lm (lumen). Under such condition, the operating mode of translucent screen 20 was changed, and the transmittance as well as the ratio (contrast) between the luminance when the entire image was made white and the luminance when the entire image was made black were measured.

In this experiment, diffusible light control film 70 was firstly brought into the diffusion state. This is because, unless diffusible light control film 70 is brought into the diffusion state, light projected from projector 11 passes through translucent screen 20, by which an image based on this projected light cannot be displayed on translucent screen 20 in the state where the contrast thereof can be measured.

Note that, for comparison, FIG. 8 also shows each of the transmittance of translucent screen 20 when it is set to the transparent mode.

Note that the transmittance of diffusible light control film 70 in the diffusion state was about 81%. As illustrated in FIG. 8, the transmittance of diffusible light control film 70 (transmissive state) when translucent screen 20 is set to the transparent mode (transmissive state) is also about 81%. This indicates that, even if diffusible light control film 70 is brought into the diffusion state, incident light is only diffused and passes through diffusible light control film 70, and the amount of attenuation of the incident light is unchanged from the amount of attenuation when diffusible light control film 70 is in the transmissive state.

In this experiment, transmittance-changeable light control film 60 was brought into the transmissive state, the semi-transmissive state, and the light blocking state, and the transmittance and the contrast ratio of the displayed image in each state were measured.

As illustrated in FIG. 8, the transmittance of transmittance-changeable light control film 60 when transmittance-changeable light control film 60 was brought into the "transmissive state" having the highest transmittance was about 64%. In this case, the total transmittance of diffusible light control film 70 and transmittance-changeable light control film 60 (hereinafter referred to as "total transmittance of light control film" was about 52%, and the transmittance of translucent screen 20 was about 56%. The reason why the transmittance of translucent screen 20 is higher than the total transmittance of light control film is considered such that the transmittance of translucent screen 20 is increased due to antireflection films 28a and 28b. The contrast ratio of the image displayed on translucent screen 20 at that time was about 92:1.

Next, the measurement was conducted by adjusting the transmittance of transmittance-changeable light control film 60 such that the contrast ratio of the image displayed on translucent screen 20 assumed the maximum value. This state is defined as the "semi-transmissive state" in FIG. 8. The transmittance of transmittance-changeable light control film 60 at that time was about 32%. In addition, the total transmittance of light control film at that time was about 26%, and the transmittance of translucent screen 20 was about 30%. The contrast ratio of the image displayed on translucent screen 20 at that time was about 150:1.

The transmittance of transmittance-changeable light control film 60 when transmittance-changeable light control film 60 was brought into the "light blocking state" having the lowest transmittance was about 4%. The total transmittance of light control film at that time was about 3%, and the transmittance of translucent screen 20 was about 6%. The contrast ratio of the image displayed on translucent screen 20 at that time was about 45:1.

As described above, it was confirmed from the result of the experiment illustrated in FIG. 8 that the contrast of the image to be displayed on translucent screen 20 can be increased by setting transmittance-changeable light control film 60 to the semi-transmissive state. The reason of this will be described below with reference to FIG. 3.

It should be noted that each of the numerical values of the transmittance and contrast illustrated in FIG. 8 varies depending on the environment where translucent screen 20 is installed, the specifications of translucent screen 20 and projector 11, and the like. Therefore, the present exemplary embodiment does not particularly limit the contrast ratio and the transmittance of an image to be displayed on translucent screen 20 to the numerical values illustrated in FIG. 8.

The reason why the contrast of an image to be displayed on translucent screen 20 is increased by setting transmittance-changeable light control film 60 to the semi-transmissive state is as stated below.

As illustrated in FIG. 3, when image light 110 is projected onto translucent screen 20 from projector 11, image light 110 passes through antireflection film 28a and transparent plate 29a, and then is diffused on diffusible light control film 70. The diffused light is incident on transmittance-changeable light control film 60, attenuates in an amount of attenuation according to the transmittance set to transmittance-changeable light control film 60, and then, passes through transparent plate 29b and antireflection film 28b to reach the eyes of user 16. In this way, transmitted light 120 passing through translucent screen 20 is viewed by user 16 as an image displayed on translucent screen 20.

On the other hand, when light source 19 is turned on, external light 10 is incident on translucent screen 20 from light source 19. A part of external light 10 incident on translucent screen 20 is reflected on the boundary between antireflection film 28b and transparent plate 29b to become reflection light 31, and the remaining external light 10 passes through transparent plate 29b. Since an antireflection layer (not illustrated) is formed on antireflection film 28b, the amount of reflection light 31 is very small as compared to external light 10.

External light 10 passing through transparent plate 29b is incident on transmittance-changeable light control film 60. At that time, a part of the incident light is reflected (not illustrated) on the boundary between transparent plate 29b and transmittance-changeable light control film 60. If transmittance-changeable light control film 60 is in the "semi-transmissive state" or "light blocking state", the amount of the reflection light is very small as compared to external light 10.

External light 10 incident on transmittance-changeable light control film 60 is attenuated in an amount of attenuation according to the transmittance set to transmittance-changeable light control film 60 when passing through transmittance-changeable light control film 60. A part of the attenuated external light 10 is then reflected on the boundary between transmittance-changeable light control film 60 and diffusible light control film 70, and again passes through transmittance-changeable light control film 60. At that time, the reflection light is again attenuated according to the transmittance set to transmittance-changeable light control film 60. The reflection light generated in this way passes through transparent plate 29b and antireflection film 26b to become reflection light 32.

In this way, reflection light 32 is the reflection light generated as a result of passing through transmittance-changeable light control film 60 twice, and therefore, the amount of reflection light 32 is very small as compared to external light 10.

If the transmittance of transmittance-changeable light control film 60 is set to be about 30%, about 70% of external light 10 is attenuated when external light 10 passes through transmittance-changeable light control film 60. The remaining 30% of external light 10 passes through transmittance-changeable light control film 60. If it is supposed that about 20% is then reflected on the boundary between transmittance-changeable light control film 60 and diffusible light control film 70, this reflected light becomes about 6% of the initial external light 10. Then, about 70% of this reflected light is attenuated when this reflected light again passes through transmittance-changeable light control film 60. Therefore, about 1/50 of the initial external light 10 becomes reflection light 32. The actual measured value of the total amount of reflection light 32, reflection light 31, and the like (total reflection light 40 illustrated in FIG. 3) was about 3/100 of initial external light 10, As described above, by setting transmittance-changeable light control film 60 to the "semi-transmissive state", translucent screen 20 in the present exemplary embodiment can reduce reflection light of external light 10, which is one of the factors to reduce the contrast, to increase the contrast of an image to be displayed.

Note that, when transmittance-changeable light control film 60 is set to the "light blocking state", the reflection light of external light 10 can further be reduced. However, as illustrated in FIG. 8, the transmittance of transmittance-changeable light control film 60 is lowered, so that image light 110 is greatly attenuated when passing through transmittance-changeable light control film 60, resulting in that the contrast of the displayed image is lowered. On the other hand, if transmittance-changeable light control film 60 is set to the "transmissive state", the transmittance is increased, so that the amount of attenuation of image light 110 when image light 110 passes through transmittance-changeable light control film 60 is suppressed. However, the effect of reducing the reflection light of external light 10 on translucent screen 20 is deteriorated. For this reason, as illustrated in FIG. 8, the contrast of the displayed image when transmittance-changeable light control film 60 is set to the "transmissive state" is lower than the contrast when transmittance-changeable light control film 60 is set to the "semi-transmissive state".

Notably, the "semi-transmissive state" in the present exemplary embodiment can be restated as the state where the transmittance of transmittance-changeable light control film 60 is set so as to reduce the reflection light of external light 10 to increase the contrast of the displayed image.

[1-3. Advantageous Effects and the Like]

As described above, in the present exemplary embodiment, the translucent screen includes a first light control film and a second light control film. The first light control film is configured to be switchable between a transmissive state for transmitting incident light therethrough and a diffusion state for diffusing incident light. The second light control film is configured such that the transmittance thereof with respect to incident light can be changed.

Note that diffusible light control film 70 is one example of the first light control film, transmittance-changeable light control film 60 is one example of the second light control film, and translucent screen 20 is one example of the translucent screen.

In this translucent screen, the second light control film may be configured to be switchable among three states, a transmissive state where the transmittance thereof is set so as to transmit incident light therethrough, a light blocking state where the transmittance thereof is set to be lower than the transmittance in the transmissive state so as to block incident light, and a semi-transmissive state where the transmittance thereof is set between the transmittance in the transmissive state and the transmittance in the light blocking state.

The translucent screen may be configured such that the second light control film has a plurality of colored particles, and the transmittance is changed due to the displacement of the particles.

Note that colored particles 64 are one example of the colored particles.

In this translucent screen, the particles may be colored with dark blue.

In this translucent screen, the particles may be colored with dark gray.

In this translucent screen, the states of the first light control film and the second light control film may be changed according to a value of a voltage to be applied thereto.

In this translucent screen, the first light control film may be disposed on the side on which image light is to be projected.

Note that image light 110 projected from projector 11 is one example of image light.

In this translucent screen, the first light control film and the second light control film may be disposed between two transparent plates.

Note that transparent plates 29a and 29b are one example of two transparent plates.

This translucent screen may have antireflection films on both surfaces thereof.

Note that antireflection films 28a and 28b are one example of the antireflection films.

In the present exemplary embodiment, the image projection system includes a projector, and a translucent screen provided with a first light control film and a second light control film.

Note that projector 11 is one example of the projector, and translucent screen 20 is one example of the translucent screen.

In this image projection system, when image light is projected to the translucent screen from the projector, the translucent screen is set to an image projection mode. In addition, when image light is not projected to the translucent screen from the projector, the translucent screen is set to a transparent mode or to a light blocking mode. In the transparent mode, the first light control film and the second light control film are both set to the transmissive state. In the image projection mode, the first light control film is set to the diffusion state, and the second light control film is set to the semi-transmissive state. In the light blocking mode, the first light control film is set to the diffusion state, and the second light control film is set to the light blocking state.

Thus, when image light is projected onto the translucent screen from the projector, and an image based on the image light is displayed on the translucent screen, reflection of external light can be reduced to increase the contrast of the displayed image.

In addition, when image light is not projected to the translucent screen from the projector, the translucent screen can be set to the transparent mode or to the light blocking mode, whereby the usability of the translucent screen can be enhanced.

This image projection system may execute the start/stop of the projection of image light from the projector and the switching of modes of the translucent screen in conjunction with each other.

Thus, the start/stop of the projection of image light from the projector and the switching of modes of the translucent screen can be in conjunction with each other, whereby the usability of the user using the image projection system can be enhanced.

Second Exemplary Embodiment

The first exemplary embodiment describes the configuration in which, in translucent screen 20, diffusible light control film 70 and transmittance-changeable light control film 60 are sandwiched between transparent plates 29a and 29b. However, the translucent screen may have only one transparent plate.

The second exemplary embodiment will be described with reference to FIGS. 9 and 10.

[2-1. Configuration]

Figure 9:
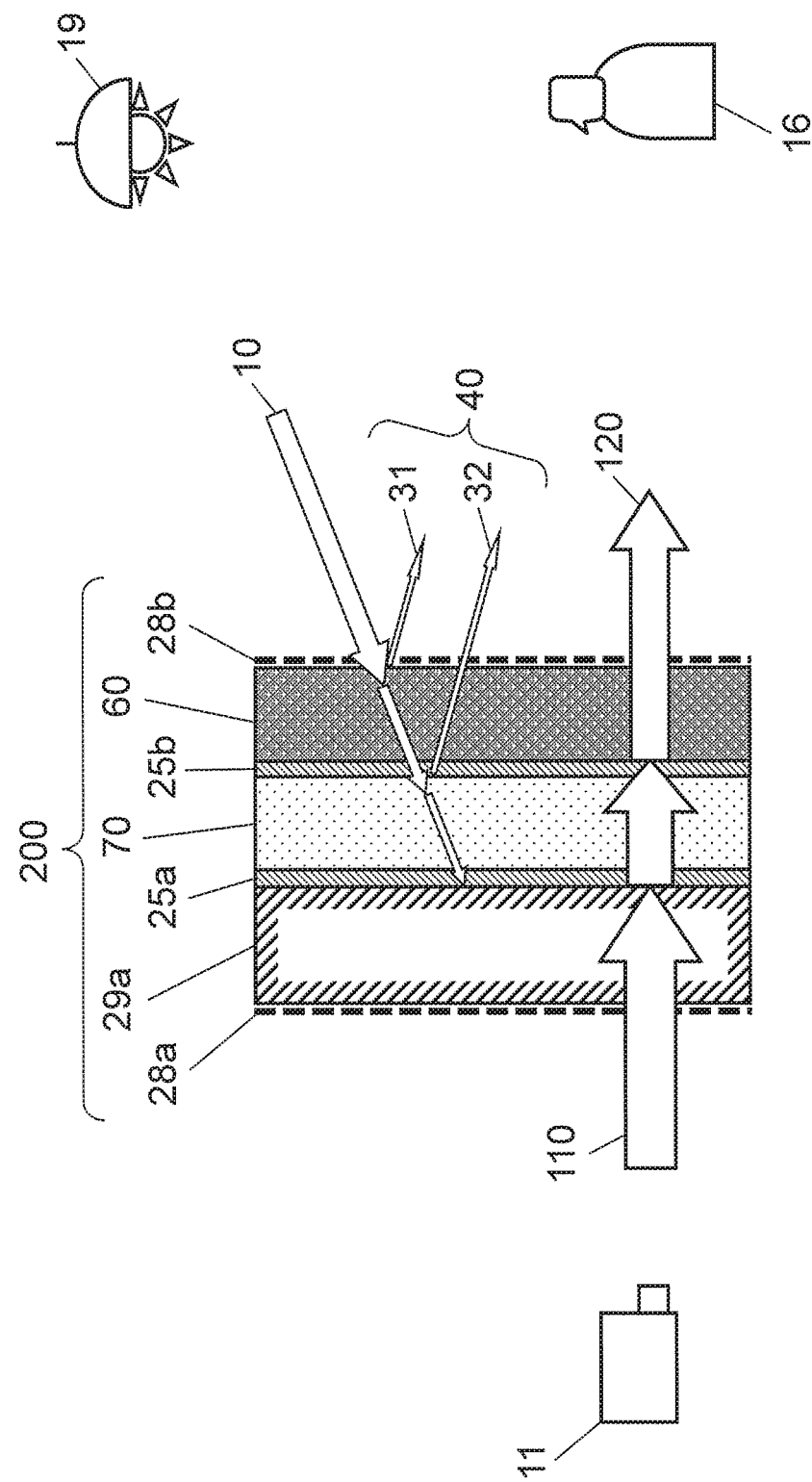
FIG. 9 is a sectional view illustrating a part of a translucent screen according to a second exemplary embodiment in an enlarged manner.

FIG. 9 is a sectional view illustrating a part of translucent screen 200 in the second exemplary embodiment in an enlarged manner.

As illustrated in FIG. 9, translucent screen 200 has transparent plate 29a, antireflection films 28a and 28b, diffusible light control film a 0, and transmittance-changeable light control film 60. Note that the components substantially similar to the components of translucent screen 20 illustrated in FIG. 3 are identified by the same reference numerals, and the description thereof will be omitted. For example, diffusible light control film 70 illustrated in FIG. 9 is substantially the same as diffusible light control film 70 illustrated in FIG. 3, and transmittance-changeable light control film 60 illustrated in FIG. 9 is substantially the same as transmittance-changeable light control film 60 illustrated in FIG. 3. The same is applied to the other components.

Translucent screen 200 has the structure described below. Antireflection film 28a is attached on one surface of transparent plate 29a, and one surface of diffusible light control film 70 is attached on the other surface through intermediate film 25a serving as a transparent adhesive layer. One surface of transmittance-changeable light control film 60 is attached on the other surface of diffusible light control film 70 through intermediate film 25b serving as a transparent adhesive layer. Antireflection film 28b is attached on the other surface of transmittance-changeable light control film 60.

[2-2. Operation]

The operation of the image projection system thus configured and provided with translucent screen 200 will be described below. Note that this image projection system is substantially the same as image projection system. 100 described in the first exemplary embodiment except that translucent screen 20 is replaced by translucent screen 200, and thus, the detailed description thereof will be omitted.

In the image projection system according to the present exemplary embodiment, translucent screen 200 is used while being set to any one of three states below, as in the first exemplary embodiment.

1) Transparent mode
2) Image projection mode
3) Light blocking mode

It is supposed that, in the image projection system according to the present exemplary embodiment, controller 12 controls each component in the image projection system in such a manner that the start/stop of the projection of image light 110 from projector 11 and the switching of modes of translucent screen 200 are in conjunction with each other, as in image projection system 100 described in the first exemplary embodiment.

To set translucent screen 200 to the "transparent mode", diffusible light control film 70 and transmittance-changeable light control film 60 are both set to the "transmissive state" as in the first exemplary embodiment.

To set translucent screen 200 to the "image projection mode", diffusible light control film 70 is set to the "diffusion state" and transmittance-changeable light control film 60 is set to the "semi-transmissive state" as in the first exemplary embodiment.

To set translucent screen 200 to the "light blocking mode", diffusible light control film 70 is set to the "diffusion state" and transmittance-changeable light control film 60 is set to the "light blocking state" as in the first exemplary embodiment.

Next, the transmittance of translucent screen 200 in each mode and the contrast of an image to be displayed on translucent screen 200 will be described with reference to FIG. 10. Note that the transmittance is a proportion of transmitted light to incident light as described above.

FIG. 10 is a diagram illustrating the result of an experiment conducted to translucent screen 200 in each operating mode in the second exemplary embodiment.

As in the first exemplary embodiment, this experiment was conducted under the condition in which translucent screen 200 and projector 11 were installed in a closed room, only a light (fluorescent light) provided on the ceiling of this room was turned on, and the entry of light other than the illumination light into this room was blocked. In this case, the illuminance on translucent screen 200 in the horizontal direction was 165 lx. In addition, the amount of light projected to translucent screen 200 from projector 11 was about 6500 lm. Under such condition, the operating mode of translucent screen 200 was changed, and the transmittance as well as the ratio (contrast ratio) between the luminance when the entire image was made white and the luminance when the entire image was made black were measured.

In this experiment, diffusible light control film 70 was brought the diffusion state as in the first exemplary embodiment. Note that, for comparison, FIG. 10 also shows the transmittance of translucent screen 200 when it is set to the transparent mode.

Note that the transmittance of diffusible light control film 70 in the diffusion state was about 81%. As illustrated in FIG. 10, the transmittance of diffusible light control film 70 (transmissive state) when translucent screen 200 was set to the transparent mode (transmissive state) was also about 81%.

In this experiment, transmittance-changeable light control film 60 was brought into the transmissive state, the semi-transmissive state, and the light blocking state, and the transmittance and the contrast ratio of the displayed image in each state were measured, as in the first exemplary embodiment.

As illustrated in FIG. 10, the transmittance of transmittance-changeable light control film 60 when transmittance-changeable light control film 60 was brought into the "transmissive state" having the highest transmittance was about 64%. In this case, the total transmittance of diffusible light control film 70 and transmittance-changeable light control film 60 (total transmittance of light control film) was about 52%, and the transmittance of translucent screen 200 was about 57%. The contrast ratio of the image displayed on translucent screen 200 at that time was about 93:1.

Next, the measurement was conducted by setting transmittance-changeable light control film 60 to be in the "semi-transmissive state" through the adjustment of the transmittance of transmittance-changeable light control film 60 such that the contrast ratio of the image displayed on translucent screen 200 assumed the maximum value. The transmittance of transmittance-changeable light control film 60 at that time was about 33%. In addition, the total transmittance of light control film at that time was about 27%, and the transmittance of translucent screen 200 was about 32%. The contrast ratio of the image displayed on translucent screen 200 at that time was about 152:1.

The transmittance of transmittance-changeable light control film 60 when transmittance-changeable light control film 60 was brought into the "light blocking state" having the lowest transmittance was about 4%. The total transmittance of light control film at that time was about 3%, and the transmittance of translucent screen 200 was about 8%. The contrast ratio of the image displayed on translucent screen 200 at that time was about 46:1.

The reason why the contrast of the displayed image can be increased by setting transmittance-changeable light control film 60 to the "semi-transmissive state" is as described in the first exemplary embodiment, so that it will not be repeatedly described below.

It should be noted that each of the numerical values of the transmittance and contrast illustrated in FIG. 10 varies depending on the environment where translucent screen 200 is installed, the specifications of translucent screen 200 and projector 11, and the like. Therefore, the present exemplary embodiment does not particularly limit the contrast ratio and the transmittance of an image to be displayed on translucent screen 200 to the numerical values illustrated in FIG. 10.

[2-3. Advantageous Effects and the Like]

As described above, in the present exemplary embodiment, the number of the transparent plate provided to translucent screen 200 is one which is less than the number of the transparent plates in translucent screen 20 in the first exemplary embodiment. The translucent screen may be configured as described above. According to the configuration of translucent screen 200 as described above, the transmittance is increased, and the contrast of the displayed image is increased, as compared to translucent screen 20 in the first exemplary embodiment, as is understood from the comparison between FIG. 10 and FIG. 8.

Third Exemplary Embodiment

The first and second, exemplary embodiments describe the operation example in which the translucent screen is used while being set to any one of the three states, i.e., the transparent mode, the image projection mode, and the light blocking mode. However, the present disclosure is not limited to the operation described above.

The third exemplary embodiment will be described below with reference to FIG. 11.

[3-1. Configuration]

Note that the image projection system in the third exemplary embodiment is substantially the same as the image projection systems described, in the first and second exemplary embodiments except that the setting for the operation of the translucent screen is different, and thus, the detailed description thereof will be omitted.

[3-2. Operation]

FIG. 11 is a diagram illustrating an operating state of the image projection system according to the third exemplary embodiment.

In the image projection system according to the present exemplary embodiment, the translucent screen is used while being set to either one of two states below, different from the first and second exemplary embodiments.
1) Transparent mode
2) Image projection mode and light blocking mode It is supposed that, in the image projection system in the present exemplary embodiment, controller 12 controls each component in the image projection system in such a manner that the start/stop of the projection of image light 110 from projector 11 and the switching of modes of the translucent screen are in conjunction with each other, as in the image projection systems in the first and second exemplary embodiments.

To set the translucent screen to the "transparent mode", diffusible light control film 70 and transmittance-changeable light control film 60 are both set to the "transmissive state" as in the first and second exemplary embodiments.

To set the translucent screen to the "image projection mode and light blocking mode", diffusible light control film 70 is set to the "diffusion state" and transmittance-changeable light control film 60 is set to the "light blocking state" as in the first exemplary embodiment.

In the present exemplary embodiment, when image light 110 is projected to the translucent screen from projector 11, the translucent screen is set to the "image projection mode and light blocking mode". In addition, when image light 110 is not projected to the translucent screen from projector 11, the translucent screen is set to the "transparent mode" or to the "image projection mode and light blocking mode". The image projection system is desirably configured such that, when projector 11 does not project image light 110, user 16 can arbitrarily choose to which mode the translucent screen is set.

Note that transmittance-changeable light control film 60 in the present exemplary embodiment may be configured such that the transmittance thereof in the "light blocking state" is substantially equal to the transmittance of transmittance-changeable light control film 60 in the "semi-transmissive state" in the first and second exemplary embodiments. To this end, the thickness of transmittance-changeable light control film 60 in the present exemplary embodiment may be smaller than the thickness of transmittance-changeable light control film 60 described in the first or second exemplary embodiment.

The specific example is as follows. When the thickness of transmittance-changeable light control films 60 described in the first and second exemplary embodiments is about 65 μm, the thickness of transmittance-changeable light control film 60 in the present exemplary embodiment may be set as about 30 μm. According to this configuration, the transmittance of transmittance-changeable light control film 60 in the "light blocking state" in the present exemplary embodiment becomes substantially equal to the transmittance of transmittance-changeable light control films 60 in the "semi-transmissive state" in the first and second exemplary embodiments.

However, the present exemplary embodiment is not limited to the configuration described above. For example, the density of colored particles 64 in transmittance-changeable light control film 60 in the present exemplary embodiment may be adjusted such that the transmittance of transmittance-changeable light control film 60 in the "light blocking state" becomes appropriate.

[3-3. Advantageous Effects and the like]

As described above, in the present exemplary embodiment, the image projection system includes a projector, and a translucent screen provided with a first light control film and a second light control film.

In this image projection system, when image light, is projected to the translucent screen from the projector, the translucent screen is set to the image projection mode and light blocking mode. In addition, when image light is not projected to the translucent screen from the projector, the translucent screen is set to the transparent mode or to the image projection mode and light blocking mode. In the transparent mode, the first light control film and the second light control film are both set to the transmissive state. In the image projection mode and light blocking mode, the first light control film is set to the diffusion state, and the second light control film is set to the light blocking state.

Thus, when image light is projected onto the translucent screen from the projector, and an image based on the image light is displayed on the translucent screen, reflection of external light can be reduced to increase the contrast of the displayed image.

In addition, when image light is not projected to the translucent screen from the projector, the translucent screen can be set to the transparent mode or to the image projection mode and light blocking mode, whereby the usability of the translucent screen can be enhanced.

This image projection system may execute the start/stop of the projection of image light from the projector and the switching of modes of the translucent screen in conjunction with each other.

Thus, the start/stop of the projection of image light from the projector and the switching of modes of the translucent screen can be in conjunction with each other, whereby the usability of the user using the image projection system can be enhanced.

Other Exemplary Embodiments

The first to third exemplary embodiments have been described above as illustrative examples of the technique in the present disclosure. However, the technique in the present disclosure is not limited thereto, and can be applied to embodiments in which various changes, replacements, additions, omissions, etc., are made. Moreover, the respective constituent elements described in the first to third exemplary embodiments described above can be combined to provide a new embodiment.

The other exemplary embodiments will be described below.

The first to third exemplary embodiments describe the operation example in which a voltage is applied to transmittance-changeable light control film 60 to change the transmittance of transmittance-changeable light control film 60. However, the present disclosure is not limited thereto. For example, a photochromic material of which coloration degree is changed according to the irradiation intensity of ultraviolet ray may be used for transmittance-changeable light control film 60. Alternatively, gas may be sealed between two glass plates, and a light control glass of which coloration degree is changed according to the concentration of the gas may be used for transmittance-changeable light control film 60.

When an antireflection layer is formed on the translucent screen, the antireflection layer may be formed on the surface of a transparent plate (or a transmittance-changeable light control film) by vapor deposition or dipping, instead of attaching the antireflection film onto the surface of the translucent screen.

The first to third exemplary embodiments describe the configuration example in which, when image light 110 is projected to the translucent screen from projector 11, the surface on the side of diffusible light control film 70 is defined as a surface to which image light 110 is to be projected, and the surface on the side of transmittance-changeable light control film 60 is defined as an image display surface. However, the surface on the side of transmittance-changeable light control film 60 may be defined as a surface to which image light 110 is to be projected and the surface on the side of diffusible light control film 70 may be defined as an image display surface.

The first to third exemplary embodiments describe the configuration example in which user 16 views the image displayed on the translucent screen from the position facing projector 11 across the translucent screen. However, the present exemplary embodiments do not particularly limit the position of user 16. User 16 may view the image displayed on the translucent screen from the same direction as projector 11.

The first to third exemplary embodiments describe the configuration example in which controller 12 controls each block through control lines 13, 14, and 15. However, controller 12 and each block may be connected in a wireless manner.

The first to third exemplary embodiments describe the operation example in which, when the translucent screen is in the transparent mode, the transmittance of transmittance-changeable light control film 60 is set to be the maximum, and when the translucent screen is in the light blocking mode, the transmittance of transmittance-changeable light control film 60 is set to be the minimum. In addition, the first to third exemplary embodiments describe the operation example in which, when the translucent screen is in the image projection mode, the transmittance of transmittance-changeable light control film 60 is set such that the contrast of the displayed image becomes the maximum. However, the "maximum" and "minimum" indicate substantially "maximum" and substantially "minimum", and errors and deviations within the range where the advantageous effects described in the exemplary embodiments can be obtained are allowed. The same is applied to diffusible light control film 70.

The "transparent mode" and the "light blocking mode" described in the first to third exemplary embodiments merely indicate that the translucent screen is in a "transparent state" and in a "state of blocking incident tight" without practical problems, and do not indicate that the translucent screen becomes completely transparent or is in a state of completely blocking incident light. The translucent screen described in the present disclosure may be semi-transparent in the transparent mode so long as there is no problem in practical use, and may be semi-transparent in the light blocking mode so long as there is no problem in practical use.

The first to third exemplary embodiments describe the operation example in which diffusible light control film 70 and transmittance-changeable light control film 60 are brought into the diffusion state and the light blocking state, respectively, when voltage to be applied is turned off. However, the present disclosure is not limited to the configuration described above. Diffusible light control film 70 and transmittance-changeable light control film 60 may be configured to be brought into the transmissive state when the voltage to be applied is turned off.

The present disclosure provides a translucent screen that can increase the contrast of an image to be displayed based on image light projected from the projector even in a bright environment, and an image projection system provided with the translucent screen.

The present disclosure is applicable to a translucent screen that displays an image based on image light projected from a projector, and an image projection system provided with the translucent screen. Specifically, the present disclosure is applicable to a window glass, a glass wall, a glass of a store window, a partition, and the like, which are used in combination with a projector.

What is claimed is:

1. An image projection system comprising:
   a translucent screen;
   a projector that projects image light to the translucent screen; and
   a controller that controls the projector and the translucent screen,
   wherein the translucent screen includes:
   a first light control film configured to be switchable between a transmissive state for transmitting incident light therethrough and a diffusion state for diffusing the incident light, and
   a second light control film configured such that transmittance thereof with respect to the incident light can be changed,
   the controller has:
      a first mode in which, in a state where the projector does not project the image light, the first light control film is set to the transmissive state and the second light control film is set to have transmittance for transmitting the incident light therethrough,
      a second mode in which, in a state where the projector projects the image light, the first light control film is set to the diffusion state and the second light control film is set to have transmittance lower than the transmittance in the first mode, and
      a third mode in which, in the state where the projector does not project the image light, the translucent screen is set to a state identical to the second mode, and
   the controller is settable to the first mode, the second mode, or the third mode.

2. The image projection system according to claim 1, wherein
   in the third mode, the first light control film is set to the diffusion state and the second light control film is set to have transmittance equal to or lower than the transmittance in the second mode.

3. The image projection system according to claim 1, wherein start and stop of projection of the image light from the projector and switching of the modes of the translucent screen are executed in conjunction with each other.

4. The image projection system according to claim 3, wherein the colored particles are colored with dark blue.

5. The image projection system according to claim 3, wherein the colored particles are colored with dark gray.

6. The image projection system according to claim 1, wherein
   the first light control film includes a liquid crystal capsule in the first light control film, the liquid crystal capsule having liquid crystal molecules, and
   the first light control film is configured to be set to the transmissive state or the diffusion state due to displacement of the liquid crystal molecules.

7. The image projection system according to claim 1, wherein
   the second light control film includes a colored capsule therein, the colored capsule having colored particles, and
   the second light control film is configured such that the transmittance thereof is changed due to displacement of the colored particles.

8. The image projection system according to claim 1, wherein states of the first light control film and the second light control film are changed according to a voltage value of a voltage to be applied thereto.

9. The image projection system according to claim 1, wherein the first light control film and the second light control film are disposed between two transparent plates.

10. The image projection system according to claim 1, further comprising an antireflection film on both surfaces of the translucent screen having the first light control film and the second light control film.

11. The image projection system according to claim 1, wherein the first light control film is disposed closer to the projector than the second light control film is.

* * * * *